(12) United States Patent
Zarakas et al.

(10) Patent No.: US 11,582,050 B2
(45) Date of Patent: Feb. 14, 2023

(54) COMPUTER-IMPLEMENTED SYSTEMS CONFIGURED FOR AUTOMATED ELECTRONIC CALENDAR ITEM PREDICTIONS AND METHODS OF USE THEREOF

(71) Applicant: Capital One Services, LLC, McLean, VA (US)

(72) Inventors: James Zarakas, Centreville, VA (US); George Bergeron, Falls Church, VA (US); Adam Vukich, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/532,242

(22) Filed: Nov. 22, 2021

(65) Prior Publication Data

US 2022/0086018 A1    Mar. 17, 2022

Related U.S. Application Data

(63) Continuation of application No. 16/872,003, filed on May 11, 2020, now Pat. No. 11,184,183, which is a continuation of application No. 16/748,529, filed on Jan. 21, 2020, now Pat. No. 10,735,212.

(51) Int. Cl.
*H04L 12/18* (2006.01)
*G06N 20/00* (2019.01)
*G06Q 10/1093* (2023.01)

(52) U.S. Cl.
CPC ......... *H04L 12/1818* (2013.01); *G06N 20/00* (2019.01); *G06Q 10/1095* (2013.01); *H04L 12/1831* (2013.01)

(58) Field of Classification Search
CPC . H04L 12/1818; H04L 12/1831; G06N 20/00; G06Q 10/1095
See application file for complete search history.

(56) References Cited

U.S. PATENT DOCUMENTS

| | | |
|---|---|---|
| 7,283,970 B2 | 10/2007 | Cragun et al. |
| 8,429,103 B1 | 4/2013 | Aradhye et al. |
| 8,620,712 B1 | 12/2013 | Mori et al. |

(Continued)

*Primary Examiner* — Jimmy H Tran
(74) *Attorney, Agent, or Firm* — Greenberg Traurig, LLP

(57) ABSTRACT

In order to facilitate electronic meeting scheduling and coordination, systems and methods are disclosed including receiving, by a processor, a plurality of electronic meeting requests to schedule a meeting. The processor determines, for each electronic meeting request, meeting room needs. A meeting scheduling machine learning model is utilized to predict parameters of meeting room objects representing the candidate meeting rooms based at least in part on the meeting room needs, schedule information associated with a respective electronic meeting request and location information associated with the respective electronic meeting request. The processor causes an indication of the candidate meeting rooms to display in response to the electronic meeting request on a screen of computing devices associated with the respective attendees based at least in part on the predicted parameters. The processor receives a selection of the respective candidate meeting rooms from the respective attendees, and dynamically secures each candidate meeting room.

20 Claims, 7 Drawing Sheets

(56) References Cited

U.S. PATENT DOCUMENTS

| | | | |
|---|---|---|---|
| 8,712,810 B2 | 4/2014 | Meisels et al. | |
| 9,467,400 B2 | 10/2016 | Bhatia et al. | |
| 10,176,463 B2 | 1/2019 | Abebe et al. | |
| 10,218,588 B1* | 2/2019 | Brisebois | G06Q 10/1095 |
| 10,643,186 B2 | 5/2020 | Runstedler et al. | |
| 10,854,330 B1 | 12/2020 | Bullington et al. | |
| 11,049,077 B1 | 6/2021 | Vukich | |
| 2003/0149606 A1 | 8/2003 | Cragun et al. | |
| 2004/0003042 A1 | 1/2004 | Horvitz et al. | |
| 2007/0071209 A1* | 3/2007 | Horvitz | G06Q 10/109 |
| | | | 379/201.06 |
| 2008/0167938 A1 | 7/2008 | Meisels et al. | |
| 2009/0165022 A1* | 6/2009 | Madsen | G06Q 10/109 |
| | | | 719/318 |
| 2009/0210351 A1* | 8/2009 | Bush | G06Q 50/188 |
| | | | 705/80 |
| 2009/0307038 A1* | 12/2009 | Chakra | G06Q 10/109 |
| | | | 705/7.18 |
| 2010/0153160 A1 | 6/2010 | Bezemer et al. | |
| 2010/0169145 A1 | 7/2010 | O'Sullivan et al. | |
| 2011/0231216 A1* | 9/2011 | Fyke | G06Q 10/1095 |
| | | | 705/7.12 |
| 2012/0150580 A1* | 6/2012 | Norton | G06Q 10/1095 |
| | | | 705/7.19 |
| 2012/0179502 A1* | 7/2012 | Farooq | H04L 12/1818 |
| | | | 705/7.13 |
| 2013/0117058 A1* | 5/2013 | Norton | G06Q 10/109 |
| | | | 705/7.19 |
| 2014/0058778 A1* | 2/2014 | McLarty | H04B 7/0857 |
| | | | 705/7.19 |
| 2015/0006218 A1* | 1/2015 | Klemm | G06Q 10/1095 |
| | | | 705/7.19 |
| 2015/0006221 A1 | 1/2015 | Mermelstein | |
| 2015/0058425 A1* | 2/2015 | Nathan | H04L 65/403 |
| | | | 709/206 |
| 2015/0142895 A1* | 5/2015 | Beran | G06Q 10/0631 |
| | | | 709/206 |
| 2015/0172237 A1* | 6/2015 | Krishna | H04L 67/025 |
| | | | 709/206 |
| 2015/0193739 A1* | 7/2015 | Min | G06Q 10/06314 |
| | | | 705/5 |
| 2015/0193819 A1* | 7/2015 | Chang | G06Q 30/0252 |
| | | | 705/7.19 |
| 2015/0237194 A1* | 8/2015 | Aaron | H04W 64/00 |
| | | | 455/414.1 |
| 2016/0092845 A1 | 3/2016 | Vogan | |
| 2016/0098687 A1 | 4/2016 | Lamons et al. | |
| 2016/0104094 A1 | 4/2016 | Yom-Tov et al. | |
| 2016/0189110 A1* | 6/2016 | Bombolowsky | G06Q 10/1095 |
| | | | 705/7.19 |
| 2016/0275458 A1 | 9/2016 | Meushar et al. | |
| 2016/0307163 A1 | 10/2016 | Bradley et al. | |
| 2016/0328681 A1 | 11/2016 | Portnoy et al. | |
| 2016/0335572 A1 | 11/2016 | Bennett et al. | |
| 2016/0350721 A1 | 12/2016 | Comerford et al. | |
| 2016/0364696 A1* | 12/2016 | Balasu | G06Q 10/1095 |
| 2017/0083872 A1 | 3/2017 | Blomberg et al. | |
| 2017/0124487 A1 | 5/2017 | Szeto et al. | |
| 2017/0178080 A1 | 6/2017 | Abebe et al. | |
| 2017/0236097 A1* | 8/2017 | Smith | G06Q 10/1095 |
| | | | 705/7.19 |
| 2017/0249580 A1 | 8/2017 | Newman et al. | |
| 2017/0308866 A1 | 10/2017 | Dotan-Cohen et al. | |
| 2017/0357949 A1* | 12/2017 | Patel | H04L 51/226 |
| 2017/0372267 A1 | 12/2017 | Softer et al. | |
| 2017/0372268 A1 | 12/2017 | Ilan et al. | |
| 2018/0025327 A1 | 1/2018 | Runstedler et al. | |
| 2018/0039931 A1 | 2/2018 | Dotson et al. | |
| 2018/0082264 A1* | 3/2018 | Szeto | G06Q 10/1095 |
| 2018/0107988 A1 | 4/2018 | Codella et al. | |
| 2018/0152487 A1 | 5/2018 | Griffin et al. | |
| 2018/0189743 A1 | 7/2018 | Balasubramanian et al. | |
| 2018/0197153 A1* | 7/2018 | Busch | G01C 21/3484 |
| 2018/0240078 A1* | 8/2018 | Goldsmith | G06Q 10/06 |
| 2019/0043021 A1* | 2/2019 | Yavor | G06Q 10/1093 |
| 2019/0050771 A1 | 2/2019 | Meharwade et al. | |
| 2019/0075506 A1 | 3/2019 | Cogion et al. | |
| 2019/0108221 A1* | 4/2019 | Nelson | G10L 15/26 |
| 2019/0108493 A1* | 4/2019 | Nelson | G06Q 10/1095 |
| 2019/0108494 A1* | 4/2019 | Nelson | G06Q 10/1095 |
| 2019/0108834 A1* | 4/2019 | Nelson | G06N 5/04 |
| 2019/0130365 A1 | 5/2019 | Pell et al. | |
| 2019/0130366 A1 | 5/2019 | Pell et al. | |
| 2019/0130367 A1 | 5/2019 | Pell et al. | |
| 2019/0179494 A1 | 6/2019 | Colagrosso et al. | |
| 2019/0180248 A1 | 6/2019 | Byun et al. | |
| 2019/0205839 A1 | 7/2019 | Dotan-Cohen et al. | |
| 2019/0267133 A1 | 8/2019 | Schwarz et al. | |
| 2019/0273767 A1* | 9/2019 | Nelson | H04M 7/0027 |
| 2019/0295041 A1 | 9/2019 | Sim et al. | |
| 2019/0332988 A1 | 10/2019 | Adamson et al. | |
| 2019/0392363 A1 | 12/2019 | Kohli | |
| 2020/0005248 A1 | 1/2020 | Gerzi et al. | |
| 2020/0042947 A1 | 2/2020 | Rakshit et al. | |
| 2020/0118045 A1* | 4/2020 | Chung | G06Q 10/06314 |
| 2020/0153964 A1 | 5/2020 | Copeland | |
| 2020/0219066 A1* | 7/2020 | Lin | G06Q 10/1095 |
| 2020/0228358 A1 | 7/2020 | Rampton | |
| 2020/0234251 A1 | 7/2020 | Ma et al. | |
| 2020/0293975 A1 | 9/2020 | Faulkner et al. | |
| 2020/0293999 A1 | 9/2020 | Bhattacharya et al. | |
| 2020/0302344 A1* | 9/2020 | Just | G06F 21/34 |
| 2020/0349525 A1* | 11/2020 | Kline | G06Q 10/1095 |
| 2020/0387873 A1 | 12/2020 | Ravi et al. | |
| 2020/0410453 A1 | 12/2020 | Nalliah et al. | |
| 2021/0035069 A1* | 2/2021 | Parikh | G06Q 30/04 |
| 2021/0056450 A1* | 2/2021 | Catalano | G06N 20/00 |
| 2021/0110352 A1 | 4/2021 | Dunne et al. | |
| 2021/0184876 A1* | 6/2021 | Kinsey | H04L 12/1818 |
| 2021/0264376 A1* | 8/2021 | Kilicoglu | G06F 40/279 |
| 2021/0272071 A1* | 9/2021 | Nelson | G06Q 10/1095 |
| 2022/0207491 A1* | 6/2022 | Vaananen | H04L 67/10 |

* cited by examiner

COMPUTER-IMPLEMENTED SYSTEMS CONFIGURED FOR AUTOMATED ELECTRONIC CALENDAR ITEM PREDICTIONS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Service, LLC, All Rights Reserved.

FIELD OF TECHNOLOGY

The present disclosure generally relates to improved computer-based platforms/systems, improved computing devices/components and/or improved computing objects configured for one or more novel technological applications of systems for automated electronic calendar management and methods of use thereof.

BACKGROUND OF TECHNOLOGY

A computer network platform/system may include a group of computers (e.g., clients, servers, smart routers (e.g., trading smart routers)) and other computing hardware devices that are linked together through one or more communication channels to facilitate communication and/or resource-sharing, via one or more specifically programmed graphical user interfaces (GUIs), among a wide range of users.

SUMMARY OF DESCRIBED SUBJECT MATTER

In some embodiments, the present disclosure provides an exemplary computer-based method/apparatus that includes at least the following steps of receiving, by at least one processor, a plurality of electronic meeting requests to schedule a meeting; where each electronic meeting request includes an attendee data identifying at least one respective attendee of each respective meeting. The at least one processor determines, for each electronic meeting request, a plurality of meeting room needs; where the plurality of meeting room needs include: i) at least one meeting room resource that the at least one respective attendee would require at least one candidate meeting room to have, and ii) a meeting room size of the at least one candidate meeting room. The at least one processor utilizes a meeting scheduling machine learning model to predict a plurality of parameters of at least one meeting room object representing the at least one candidate meeting room based at least in part on the plurality of meeting room needs, schedule information associated with a respective electronic meeting request and location information associated with the respective electronic meeting request; where the plurality of parameters of at least one meeting room object includes: i) a meeting location parameter, and ii) a meeting time parameter; where the schedule information includes: i) an availability data identifying availability of each of the at least one respective attendee based on respective calendar data obtained from each respective electronic calendar associated with the respective at least one attendee, ii) a meeting history data identifying meeting history of the at least one respective attendee based on the respective calendar data obtained from each respective electronic calendar associated with the respective at least one attendee, where the meeting history data includes: 1) cancellation data identifying meeting cancellations, and 2) rescheduling data identifying meeting rescheduling occurrences; where the location information includes: i) an attendee location data identifying at least one respective location associated with the at least one respective attendee, ii) available meeting room data identifying all available meeting rooms, and iii) a meeting room location associated with each available meeting room. The at least one processor causes to display an indication of the at least one candidate meeting room in response to the at least one electronic meeting request on a screen of at least one computing device associated with the at least one respective attendee based at least in part on the plurality of predicted parameters of at least one respective meeting room object representing at least one respective candidate meeting room. The at least one processor receives a selection of the at least one respective candidate meeting room from the at least one respective attendee, and dynamically secures the at least one respective candidate meeting room for at least one respective meeting.

In some embodiments, the present disclosure provides an exemplary computer-based method that includes at least the following steps of receiving, by the at least one processor, a plurality of electronic reschedule requests to reschedule a plurality of scheduled meetings for a plurality of meeting rooms; where each electronic reschedule request includes an attendee data identifying at least one respective attendee of each respective scheduled meeting. The at least one processor determines for each electronic schedule request, a plurality of meeting room needs; where the plurality meeting room needs include: i) at least one meeting room resource that the at least one respective attendee would require at least one candidate meeting room to have, and ii) a meeting room size of the at least one candidate meeting room. The at least one processor determines an error in a plurality of parameters of at least one meeting room object representing the at least one candidate meeting room for training a meeting scheduling machine learning model based at least in part on a plurality of respective scheduled meetings associated with a plurality of respective electronic reschedule requests, schedule information associated with the respective electronic reschedule request and location information associated with the respective electronic reschedule request; where the plurality of parameters of at least one meeting room object includes: i) a meeting location parameter, and ii) a meeting time parameter; where the schedule information includes: i) an availability data identifying availability of each of the at least one respective attendee based on respective calendar data obtained from each respective electronic calendar associated with the respective at least one attendee, ii) a meeting history data identifying meeting history of the at least one respective attendee based on the respective calendar data obtained from each respective electronic calendar associated with the respective at least one attendee, where the meeting history data includes: 1) cancellation data identifying meeting cancellations, and 2) rescheduling data identifying meeting rescheduling occurrences; where the location information includes: i) an attendee location data identifying at least one respective location associated with the at least one respective attendee, ii) available meeting room data identifying all available meeting rooms, and iii) a meeting room location associated with each available meeting room. The at least one processor utilizes the meeting scheduling machine learning model to predict a plurality of new parameters of the at least one meeting room object representing the at least one candidate meeting room based at least in part on the plurality of meeting room needs, the schedule information associated with a respective electronic meeting request and the location information associated with the respective electronic meeting request. The at least one processor causes to display an indication of the at least one candidate meeting room in response to the at least one electronic reschedule request on a screen of at least one computing device associated with the at least one respective attendee based at least in part on the plurality of predicted parameters of the at least one respective meeting room object representing the at least one respective candidate meeting room. The at least one processor receives a selection of the at least one respective candidate meeting room from the at least one respective attendee, and dynamically secures the at least one respective candidate meeting room for at least one respective meeting.

In some embodiments, the present disclosure provides an exemplary computer-based system that includes at least the following components of a calendar database configured to store calendar data associated with each employee of an organization, a meeting room database configured to store meeting room characteristics of possible meeting rooms of the organization; and at least one processor in communication with the calendar database and the meeting room database. The at least one processor is configured to: receive a plurality of electronic meeting requests to schedule a meeting, where each electronic meeting request includes an attendee data identifying at least one respective attendee of each respective meeting; determine for each electronic meeting request, a plurality of meeting room needs, where the plurality of meeting room needs include: i) at least one meeting room resource that the at least one respective attendee would require at least one candidate meeting room to have, and ii) a meeting room size of the at least one candidate meeting room; and utilize a meeting scheduling machine learning model a to predict a plurality of parameters of at least one meeting room object representing the at least one candidate meeting room based at least in part on the plurality of meeting room needs, schedule information associated with a respective electronic meeting request and location information associated with the respective electronic meeting request; where the plurality of parameters of at least one meeting room object includes: i) a meeting location parameter, and ii) a meeting time parameter; where the schedule information includes: i) an availability data identifying availability of each of the at least one respective attendee based on respective calendar data obtained from each respective electronic calendar associated with the respective at least one attendee, ii) a meeting history data identifying meeting history of the at least one respective attendee based on the respective calendar data obtained from each respective electronic calendar associated with the respective at least one attendee, where the meeting history data includes: 1) cancellation data identifying meeting cancellations, and 2) rescheduling data identifying meeting rescheduling occurrences; where the location information includes: i) an attendee location data identifying at least one respective location associated with the at least one respective attendee, ii) available meeting room data identifying all available meeting rooms, and iii) a meeting room location associated with each available meeting room; cause to display an indication of the at least one candidate meeting room in response to the at least one electronic meeting request on a screen of at least one computing device associated with the at least one respective attendee based at least in part on the plurality of predicted parameters of the at least one respective meeting room object representing the at least one respective candidate meeting room; receive a selection of the at least one respective candidate meeting room from the at least one respective attendee; and dynamically secure the at least one respective candidate meeting room for at least one respective meeting.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
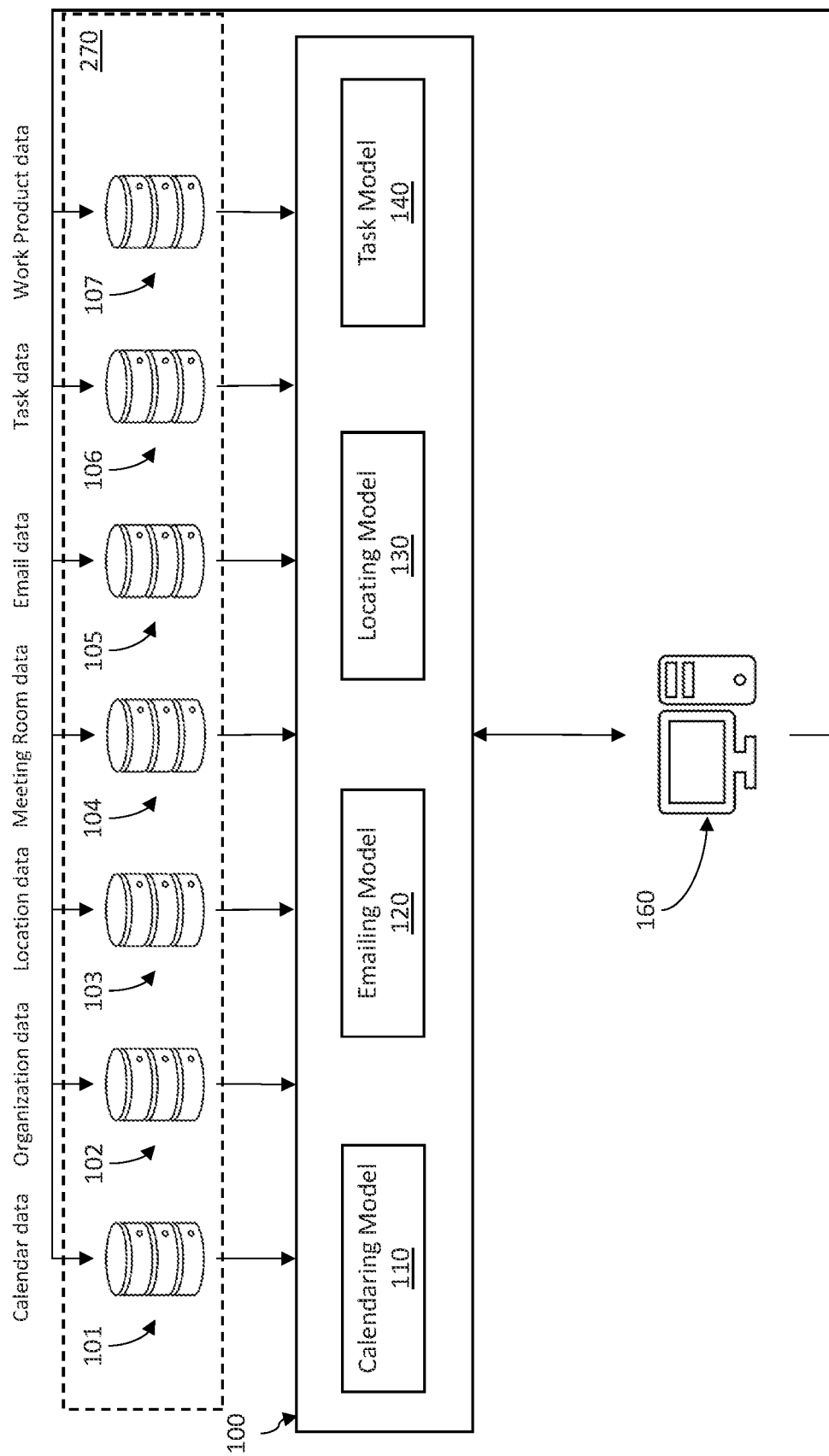
FIGS. 1-7 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device)

occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device, mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, exemplary inventive computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIG. 1 through 7 illustrate systems and methods of meeting rescheduling predictions using machine learning techniques and database intercommunication. The following embodiments provide technical solutions and/or technical improvements that overcome technical problems, drawbacks and/or deficiencies in the technical fields involving machine learning, database technologies, networking technologies, dynamic resource management, message coordination, among others. As explained in more detail, below, technical solutions and/or technical improvements herein include aspects of improved database communication and record keeping, dynamic resource management, and machine learning. Based on such technical features, further technical benefits become available to users and operators of these systems and methods. Moreover, various practical applications of the disclosed technology are also described, which provide further practical benefits to users and operators that are also new and useful improvements in the art.

FIG. 1 depicts a diagram of an exemplary illustrative collaboration system according to an illustrative embodiment of the present invention.

In some embodiments, a collaboration system 100 access schedule and communication data associated with users to facilitate collaboration between and amongst the users by providing collaborative services and functions. In some embodiments, the collaboration services include predictions as to various collaborative interactions, such as, e.g., predicting optimum meeting schedules, email prioritization, task schedules and prioritization, among other collaboration services, and generating electronic calendar and electronic communication items, such as, electronic calendar meeting invites, electronically booking locations such as meeting rooms, and electronically ordering and prioritizing communication. In some embodiments, the collaboration system 100 may automatically convey the prediction to each user involved with the collaborative interaction at a respective user computing device 160.

In some embodiments, the user computing device 160 may include a personal computer, a mobile computing device such as a tablet or smartphone, among other computing devices. In some embodiments, there may be a plurality of user computing devices 160 in communication with the collaboration system 100, such as, e.g., between about 1 and about 10 computing devices, between about 1 and about 20 computing devices, between about 1 and about 100 computing devices, or any other number of computing devices for providing collaboration services to each user of, e.g., a set of customers, an organization such as a company, corporation, foundation, family, social club, school, university, government agency, or other organization, a set of organizations, or other group of users.

In some embodiments, the collaboration system 100 receives data from multiple data sources related to user schedules, relationships and communication to facilitate comprehensive and accurate prediction of collaboration characteristics for automatically initiating collaborative interactions. In some embodiments, the data may include, e.g., user calendar data, organizational personnel data, user location data, meeting room data, user email data, user task data, user work product data, among other task, communication and schedule data. Accordingly, in some embodiments, the collaboration system 100 receives the user calendar data, the organizational personnel data, the user location data, the meeting room data, the user email data, the user task data, and the user work product data from a calendar database 101, an organization database 102, a location database 103, a meeting room database 104, an email database 105, a task database 106, and a work product database 107, respectively.

In some embodiments, the calendar database 101 may include a virtual calendar associated with each user in communication with the collaboration system 100 via a respective user computing device 160. The virtual calendar may include scheduled meetings and appointments, out-of-office periods, scheduled vacations, working hours, among other calendar-related data of each user in communication with collaboration system 100. In some embodiments, the virtual calendar may include scheduling information such as, e.g., availability and meeting history (e.g., cancellations, rescheduled meetings, relocated meeting, etc.) that are represented in a calendar program associated with each user. Examples of such calendar programs may include but are not limited to, e.g., Microsoft™ Outlook™, Google™ Calendar, Apple™ Calendar, IBM™ Notes, among other programs having virtual calendaring functions. Information entered into such programs may be stored in the calendar database 101 to aggregate scheduling information for use by the collaboration system 100.

In some embodiments, the organization database 102 may include a virtual organization chart or other representation of position hierarchy associated with each user in communication with the collaboration system 100 via a respective user computing device 160. The virtual organization chart may include a hierarchy of personnel in an organization and an organization structure, including, e.g., entry-level personnel up through senior management and executives.

In some embodiments, the location database 103 may include a representation of a location of each user in communication with the collaboration system 100 via a respective user computing device 160. The location may include, e.g., a latitude and longitude, a street address, a building identification, a room identification within a building, a floor within a building, among others and combinations thereof.

In some embodiments, the meeting room database 104 may include a list of possible meeting rooms and a representation of a location of each room listed as a possible meeting room. The location may include, e.g., a latitude and longitude, a street address, a building identification, a room identification within a building, a floor within a building, among others and combinations thereof.

In some embodiments, the email database 105 may include, e.g., an archive of sent and received emails associated with each user in communication with the collaboration system 100. In some embodiments, the emails may include, e.g., metadata, text, attachments, media, recipients, senders, carbon-copy (CC) recipients, among other data associated with each email. In some embodiments, the emails may be extracted or otherwise received from an email program and/or service associated with each user. Examples of such email programs and/or services may include but are not limited to, e.g., Microsoft™ Outlook™, Google™ Gmail™, Apple™ Mail, IBM™ Notes, among other email programs and services. Information entered into such programs may be stored in the calendar database 101 to aggregate scheduling information for use by the collaboration system 100.

In some embodiments, the task database 106 may include a history of work tasks assigned to each user. In some embodiments, the history may include, e.g., start dates, completion dates, start times, completion times, task subject, task project, collaborators and/or team-mates associated with each task, among other task related data. In some embodiments, the task database 106 may receive the task history from project management, task management and task tracking platforms and programs, such as, e.g., Jira™, Microsoft Dynamics™, NetSuite™, Launchpad™, among others and combinations thereof.

In some embodiments, the work product database 107 may include a history of work product produced by each user in communication with the collaboration system 100. In some embodiments, the work product may include completed projects, such as, e.g., papers, administrative documents, published documents, documents submitted to, e.g., supervisors and/or project management platforms as complete, source code, software releases, among other types of work product. The work product database 107 may include, e.g., a document repository, a document storage, a cloud storage platform, a server database, a distributed database, among others.

As used herein, a "database" refers to any suitable type of database or storage system for storing data. A database may include centralized storage devices, a distributed storage system, a blockchain network, and others, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

In some embodiments, the collaboration system 100 may include models for performing multiple collaborative services. In some embodiments, the collaboration system 100 includes a calendaring model 110 to, e.g., automatically schedule, reschedule and cancel meetings, appointments, out-of-office periods, unavailability periods, and other virtual calendar items associated with users based on data from one or more of the calendar database 101, the organization database 102, the location database 103, the meeting room database 104, the email database 105, the task database 106, and the work product database 107. In some embodiments, the calendaring model 110 may include, e.g., machine learning models, such as, e.g., one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments, the calendaring model 110 may, e.g., employ the AI/machine learning techniques to predict an optimum meeting between attendees based on, e.g., location data, meeting room data, and schedule information including, e.g., calendar data such as availability and meeting history (e.g., cancellations, rescheduling, etc.) among others. Based on such data received from, e.g., the calendar database 101, the location database 103, and the meeting room database 104, the machine learning model may predict a place and time that is least likely to be cancelled or rescheduled. In some embodiments, the machine learning model may incorporate organizational hierarchies from the organization database 102 to prioritize the schedule and location of attendees higher in the hierarchy.

In some embodiments, the calendaring model 110 may employ the machine learning model and/or AI/machine learning techniques as described above to reschedule cancelled meetings. Such rescheduled meetings may be rescheduled automatically based on, e.g., location data, meeting room data, and schedule information including, e.g., calendar data such as availability and meeting history (e.g., cancellations, rescheduling, etc.) among others, from the location database 103, the meeting room database 104 and/or the calendar database 101.

In some embodiments, the collaboration system 100 includes an emailing model 120 to, e.g., determine an order of priority of received emails. In some embodiments, the collaboration system 100 may receive electronic messages, including emails, instant message communications, simple message service (SMS) messages, among other electronic message formats. In some embodiments, the emailing model 120 may receive and/or determine indicators of attributes of the electronic messages, such as, e.g., sender, recipient or recipients, carbon-copied (cc'd) recipients, subject line text, electronic message text, attached files and/or media, hyperlinks, urgency markers, read-receipts, associated conversations for each electronic message, related calendar events, such as a calendar event created with the electronic message or a calendar event for which the electronic message is a response, among other attributes. In some embodiments, the emailing model 120 may include, e.g., AI/machine learning techniques, such as those described above, to form parameters from one or more of the attributes, such as, e.g., subject line text, sender including data from the organization database 102, and related calendar events including calendar data from the calendar database 101 by correlating each of the attributes with a likelihood of the user viewing, responding to, forwarding, deleting, delaying, or otherwise interacting with the electronic message.

In some embodiments, using the parameters, the AI/machine learning techniques of the emailing model 120 may predict a level of priority of each electronic message. In some embodiments, the level of priority may be a priority scale, such as a numeric scale in a range of between about 1 and about 10, between about 1 and about 5, between about 1 and about 100, or other range. In some embodiments, the level of priority may include a relative level of priority, where the emailing model 120 ranks each electronic message according to a relative priority level compared to each other electronic message. Accordingly, in some embodiments, a user may be presented with a list of electronic messages in an order of priority such that the most important and/or actionable electronic messages may be presented first. In some embodiments, the collaboration system 100 includes a locating model 130 to, e.g., optimize a location of a meeting based on, e.g., location data from the location database 103 and meeting room data from the meeting room database 104. In some embodiments, the locating model 130 employs AI/machine learning techniques, such as those described above, to predict an optimum location for a meeting that will reduce the likelihood of the meeting being cancelled, rescheduled or relocated. In some embodiments, the optimum location depends on a location of each attendee to a meeting as well as a location of each available meeting room for the meeting. In some embodiments, the locating model 130 may also take into account meeting room resources, such as, e.g., video conferencing equipment, technology support, size, furniture, among other features of a meeting room. In some embodiments, the predicted optimum location can be provided to the calendar model 110, which may, in turn, automatically schedule a meeting using the predicted optimum meeting location.

In some embodiments, the collaboration system 100 includes a task model 140 to, e.g., automatically schedule calendar events to perform a task associated with one or more meetings based on, e.g., email data from the email database 105 associated with emails related to the meetings, task data from the task database 106 associated with current and past tasks of each attendee, and work product data from the work product database 107 associated with completed work product of each attendee. In some embodiments, the task model 140 interacts with the calendar model 110 to determine tasks associated with an upcoming meeting, a time to complete the tasks, and attendees associated with the task. To do so, in some embodiments, the task model 140 employs AI/machine learning techniques, such as those described above, to predict a task parameter leading up to the meeting. The task parameter can be used by the calendar model 110 to automatically determine a task time and location for the associated attendees to complete the task prior to the meeting. In an embodiment, the calendar model 110 may then automatically schedule the task time and location each attendee's respective calendar to facilitate private, uninterrupted work time.

Figure 2:
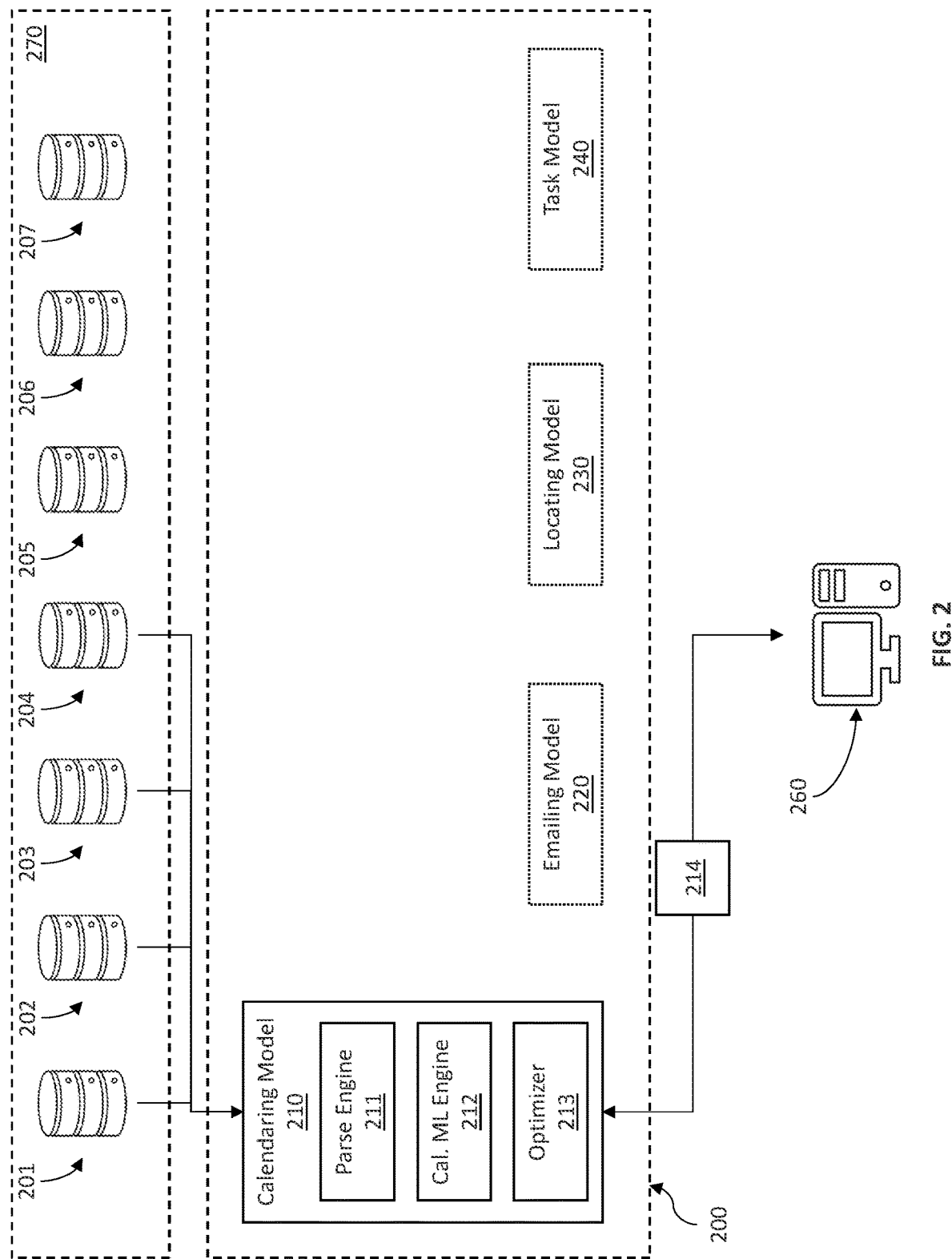

FIG. 2 depicts a diagram of a calendaring model for an exemplary illustrative automated calendar management system in accordance with an illustrative embodiment of the present invention.

In some embodiments, a collaboration system 200 includes a calendaring model 210 in communication with collaboration databases, such as, a calendar database 201, an organization database 202, a location database 203 and a meeting room database 204, among other suitable databases for providing information for calendar and meeting collaboration. In some embodiments, each of the collaboration databases may include data in a suitable format, such as, e.g., tables, text, tuples, arrays, etc. Each data item in the collaboration databases may also include metadata associated with information such as, e.g., origin of the data, destination, format, time and date, geographic location information, source identifier (ID), among other information.

In some embodiments, the calendaring model 210 may leverage the data in the collaboration databases, including associated metadata, to predict optimum meeting times and/or locations, such as optimum meeting times based on scheduling information related to attendees, optimum meeting locations based on location information associated with the attendees as well as available meeting rooms, and meeting room resources.

In some embodiments, the calendaring model 210 may predict the meeting times and/or locations in response to a user interaction 214 from a user computing device 214. In some embodiments, the user interaction 214 includes, e.g., requesting a meeting with a group of attendees. Meeting requests may sometimes include a time period and a list of attendees to attend the meeting.

In some embodiments, the calendaring model 210 may predict a time and location for the requested meeting using the data in the collaboration databases. The calendaring model 210 may receive the data and employ a parse engine 211, a calendar machine learning engine 212 and an optimizer 213 to deduce a correlation between the data and an optimum meeting schedule, including the meeting location and the meeting time. In some embodiments, each of the parse engine 211, calendar machine learning engine 212 and the optimizer 213 may include, e.g., software, hardware and/or a combination thereof. For example, in some embodiments, the parse engine 211 may include a processor and a memory, the memory having instructions stored thereon that cause the processor to parse data. In some embodiments, the calendar machine learning engine 212 may include a processor and a memory, the memory having instructions stored thereon that cause the processor to predict optimum meeting times and locations from the parsed data. In some embodiments, the optimizer 213 may include a processor and a memory, the memory having instructions stored thereon that cause the processor to optimize the parse engine 211 and/or the calendar machine learning engine 212 according to, e.g., an error of the predicted meeting time and location.

In some embodiments, the parse engine 211 may transform the data as well as the user interaction 214 including the meeting request into, e.g., feature vectors or feature maps such that the calendar machine learning engine 212 may generate meeting predictions based on features of the data. Thus, in some embodiments, the parse engine 211 may receive the data, parse the data, and extract features according to a feature extraction algorithm. Data parsing and feature extraction may utilize methods depending on a type of data being received. For example, the parse engine 211 may include language parsing when the data includes text and character strings. Thus, in some embodiments, the parse engine 211 may include, e.g., a classifier for natural language recognition. However, in some embodiments, the data may be a table. In such a case, the parse engine 211 may simply extract features into, e.g., a feature vector directly from the data. However, in some embodiments, the data may include a combination of character strings, as well as structured data, such as tables, tuples, lists, arrays, among other. Thus, in some embodiments, the parse engine 211 may include model or algorithm for parsing the character strings and then extracting feature vectors from the structured data and the parsed character strings.

In some embodiments, the feature extraction algorithm may include, e.g., independent component analysis, an isomap, kernel principle component analysis (PCA), latent semantic analysis, partial least squares, principal component analysis, multifactor dimensionality reduction, nonlinear dimensionality reduction, multilinear PCA, multilinear subspace learning, semidefinite embedding, autoencoding, among others and combinations thereof. As a result, the parse engine 211 may generate feature vectors having, e.g., availability and meeting history features, personnel features, attendee location features, available meeting room features, and/or out-of-office features, among other possible features.

In some embodiments, the feature vectors produced by the parse engine 211 may be employed by the calendar machine learning engine 212 to develop a prediction for an optimum meeting time and location. In some embodiments, the calendar machine learning engine 212 is configured to make at least two predictions in response to the feature vectors: a meeting location and a meeting time associated with the meeting request. In some embodiments, the calendar machine learning engine 212 may utilize, e.g., classification machine learning techniques to develop a prediction from the availability and meeting history features, personnel features, attendee location features, and available meeting room features for each meeting for each meeting request. In some embodiments, the result of this prediction process produces a meeting location parameter and a meeting time parameter for each meeting that correspond to an optimal meeting time for all of the attendees of each meeting request, and an optimal location for all of the attendees, respectively.

For example, in some embodiments, the calendar machine learning engine 212 may include, e.g., a convolutional neural network (CNN) having multiple convolutional layers to receive a feature map composed of each of the feature vectors, convolutionally weight each element of the feature map using the convolutional layers, and generate an output representing both the meeting location parameter and the meeting time parameter. However, in some embodiments, the calendar machine learning engine 212 may include two models, a meeting location machine learning model and a meeting time machine learning model. Each of the meeting location machine learning model and the meeting time machine learning model may receive the feature map and generate respective outputs of the meeting location parameter and the meeting time parameter separately.

In some embodiments, the calendar machine learning engine 212 may then convert the meeting location parameter and the meeting time parameter into a meeting request to submit to the user and any other attendees of each of the rescheduled meetings. In some embodiments, the meeting request is transmitted to the user computer 260 to produce a meeting request indication for the user to select, decline, or modify. The selection and/or modification may cause the collaboration system 200 to automatically book the meeting room associated with the meeting location parameter at the time associated with the meeting room parameters.

In some embodiments, one or more of the user and/or attendees may accept, decline or modify the meeting request with a response. The response or responses may then be returned to an optimizer 213 that evaluates the meeting location parameters and the meeting time parameter against a ground truth. Here, the ground truth may be the responses associated with the meeting request. Thus, in effect, each response to the meeting request may be used as feedback into the optimize 213 to optimize the calendaring model 210 for on-line learning. Thus, in some embodiments, the optimizer 213 may determine an error associated with the predicted meeting location parameter and meeting time parameter as compared to the time and location of the meeting request and whether the meeting request was accepted or not. In some embodiments, the optimizer 213 may backpropagate the error to the parse engine 211, the calendar machine learning engine 212, or both to train each engine in an on-line fashion.

Figure 3:
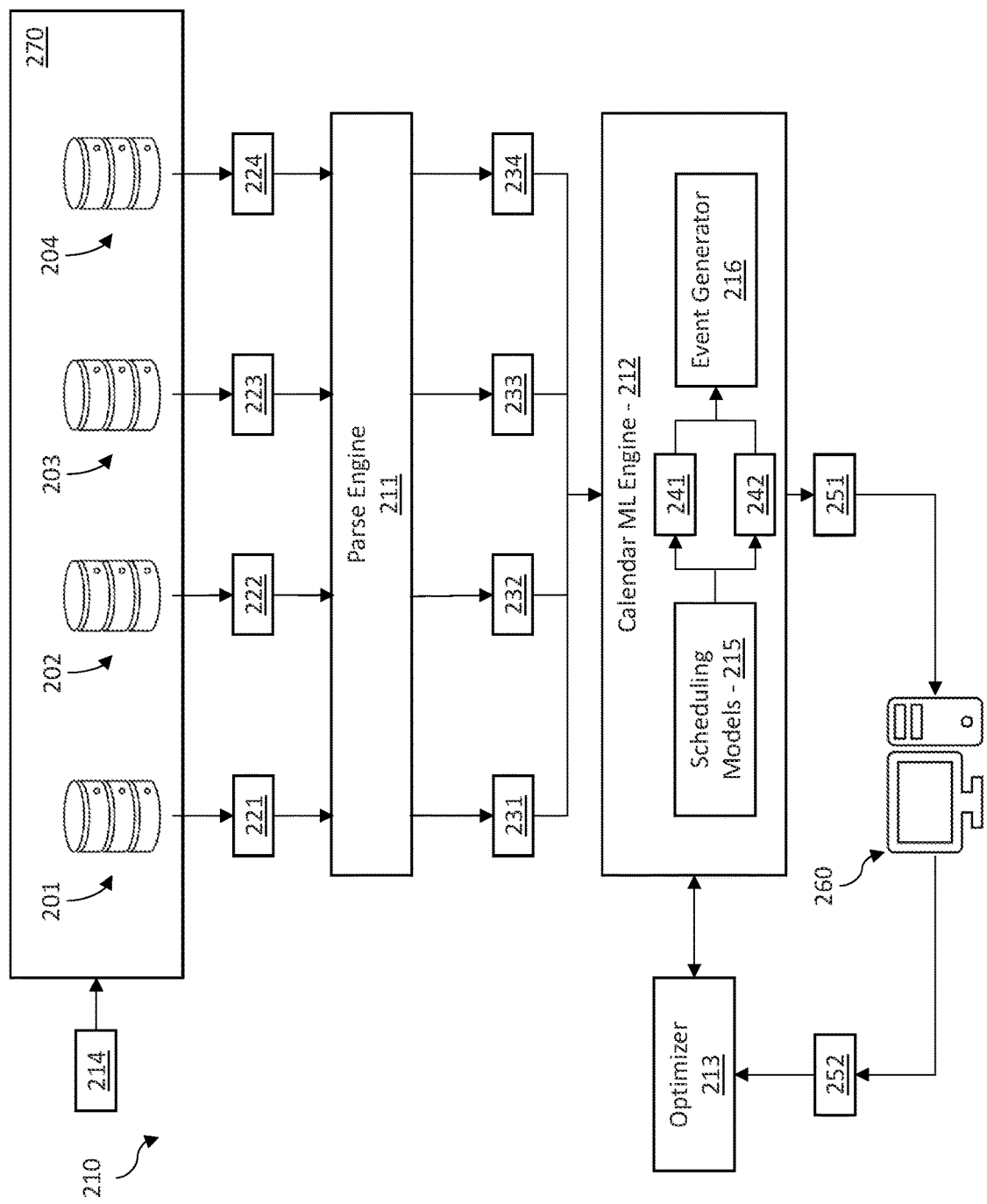

FIG. 3 depicts a diagram of a calendaring model for an exemplary illustrative automated calendar management system in accordance with an illustrative embodiment of the present invention.

In some embodiments, a collaboration system 200 may initiate an automated meeting rescheduling process upon receipt of a user interaction including, e.g., meeting request data 214 indicative of meeting requests by users at user computing devices 260. In some embodiments, the user interaction includes a meeting request including, e.g., a meeting subject, a set of attendees, and/or a meeting time-frame or deadline. The meeting request may be provided by, e.g., a user computing device, such as the user computing device 260 or other device, that generates the meeting request data 214. In some embodiments, the meeting request data 214 includes, e.g., a meeting subject, a set of attendees, and/or a meeting time-frame or deadline. In some embodiments, the meeting request data 214 may include data formatted for the collaboration system 200 and ready to undergo feature extraction. However, in some embodiments, the meeting request data 214 may include an image, character string, or other unstructured data related to the meeting request. In some embodiments, where the meeting request data 214 is unstructured, the parse engine 211 may parse the date using, e.g., a parsing algorithm such as a natural language recognition model, an image recognition model, or other algorithm.

In some embodiments, based on the meeting request data 214, the collaboration system 200 may pull data from collaboration databases 270 including each of the calendar database 201, the location database 203, and the meeting room database 204 associated with the data range of the out-of-office period. Accordingly, the parse engine 211 may receive, e.g., availability and meeting history data 221 from the calendar database 201 related to meetings within the meeting request time-frame or in a period until the meeting request deadline. However, in some embodiments, the meeting request may have no time-frame or deadline. Thus, in some embodiments, the parse engine 211 may receive data from the collaboration databases 270 for a predetermined time period, e.g., about a one-week period, about a one month period, about a two month period, about a six month period, about a one year period, or other suitable time-frame starting at a date at which the meeting request is submitted. Similarly, the parse engine 211 may receive, e.g., attendee location data 223 and available meeting room data 224 from the location database 203 and the meeting room database 204, respectively.

In some embodiments, the calendar database 201 may identify a meeting history associated with each attendee specified in the meeting request data 214, including the user. The meeting history may include scheduled meetings, cancelled meetings, rescheduled meetings, relocated meetings, among other meeting history items. In some embodiments, the calendar database 201 may provide the scheduled meetings, attendees, and meeting histories to the parse engine 211 as availability and meeting history data 221.

In some embodiments, the organization database 202 may utilize the attendees identified by the meeting request data 214 to identify attendee hierarchy within an associated organization according to, e.g., an organization chart or other data related to personnel hierarchy for the associated organization. The organization database 202 may provide the attendee hierarchy based on the, e.g., organization chart, to the parse engine 211 as personnel data 222 associated with each attendee of each scheduled meeting.

In some embodiments, the location database 203 may utilize the attendees identified by the meeting request data 214 to identify locations, such as, e.g., office locations, of each of the attendees of each of the scheduled meetings. The location database 203 may provide the location information to the parse engine 211 as attendee location data 223.

In some embodiments, the meeting room database 204 may utilize the meeting request data 214 to determine a set of available meeting rooms, e.g., for a predetermined period near the meeting request date, or prior to a deadline or end of time-frame specified by the meeting request data 214. For example, in some embodiments, the meeting room database 204 may track meeting room characteristics, including, e.g., availability, location, size, resources, among other characteristics for each known meeting location. The meeting room database 204 determine a set of available meeting rooms based on the meeting room availability within, e.g., about one week, about two weeks, about one month, or other suitable time of the meeting request date. The characteristics of the set of available meeting rooms may be provided to the parse engine 211 as available meeting room data 224.

In some embodiments, the parse engine 211 may receive, e.g., each of the availability and meeting history data 221, the personnel data 222, the attendee location data 223 and the available meeting room data 224 and extract features. Thus, in some embodiments, the parse engine 211 may transform the data from the collaboration databases 270 into, e.g., feature vectors or feature maps. Thus, in some embodiments, the parse engine 211 may receive the data, parse the data, and extract features according to a feature extraction algorithm. Data parsing and feature extraction may utilize methods depending on a type of data being received. For example, the parse engine 211 may include language parsing when the data includes text and character strings. In some embodiments, the parse engine 211 may include, e.g., a classifier for natural language recognition. However, in some embodiments, the data may be a table. In such a case, the parse engine 211 may simply extract features into, e.g., a feature vector directly from the data. However, in some embodiments, the data may include a combination of character strings, as well as structured data, such as tables, tuples, lists, arrays, among other. Thus, in some embodiments, the parse engine 211 may include model or algorithm for parsing the character strings and then extracting feature vectors from the structured data and the parsed character strings.

In some embodiments, as a result of the parsing and feature extraction, the parse engine 211 may produce meeting history features 231, personnel features 232, attendee location features 233 and available meeting room features 234 from each of the meeting history data 221, the personnel data 222, the attendee location data 223 and the available meeting room data 224, respectively.

In some embodiments, the feature extraction algorithm may include, e.g., independent component analysis, an isomap, kernel principle component analysis (PCA), latent semantic analysis, partial least squares, principal component analysis, multifactor dimensionality reduction, nonlinear dimensionality reduction, multilinear PCA, multilinear subspace learning, semidefinite embedding, autoencoding, among others and combinations thereof. As a result, the parse engine 211 may generate feature vectors having, e.g., meeting history features 231, the personnel features 232, the attendee location features 233 and the available meeting room features 234 such that predictive features of scheduling information and location information can be provided to the calendar machine learning engine 212. In some embodiments, the feature vectors are aggregated into a feature map prior to modeling in the calendar machine learning engine 212.

In some embodiments, the calendar machine learning engine 212 receives the meeting history features 231, the personnel features 232, the attendee location features 233 and the available meeting room features 234 to model meeting time and location for each meeting requested by the meeting requests of the meeting request data 214 to predict optimum meetings. In some embodiments, the calendar machine learning engine 212 includes scheduling models 215 to predict the location and time of a meeting that is most likely to be accepted by all attendees.

In some embodiments, the scheduling models 215 may include separate models for predicting meeting times for the meetings to be scheduled, and predicting meeting locations for meetings to be scheduled. In some embodiments, a meeting time model may predict a meeting time parameter 241 that represents an optimum meeting time for each attendee of each meeting to be scheduled according to the meeting request data 214. In some embodiments, the meeting time model may predict the meeting time parameter 241 based on scheduling information and personnel information, including, e.g., the meeting history features 231, the personnel features 232 and the available meeting room features 234. In some embodiments, using, e.g., a classifier, such as those described above, the meeting time model may transform the meeting history features 231, the personnel features 232 and the available meeting room features 234 into a feature vector output that may be decoded into the meeting time parameter 241 representing the optimum meeting time based on the scheduling information of the attendees and meeting rooms.

In some embodiments, a meeting location model may predict a meeting location parameter 242 that represents an optimum meeting location for each attendee of each meeting to be scheduled according to the meeting request data 214. In some embodiments, the meeting time model may predict the meeting location parameter 242 based on location information and personnel information, including, e.g., the meeting history features 231, the personnel features 232, the attendee location features 233 and the available meeting room features 234. In some embodiments, using, e.g., a classifier, such as those described above, the meeting location model may transform the meeting history features 231, the personnel features 232, the attendee location features 233 and the available meeting room features 234 into a feature vector output that may be decoded into the meeting location parameter 242 representing the optimum meeting location based on the location information of the attendees and meeting rooms.

While an arrangement of the scheduling models 215 is described above in accordance with some embodiments of the present collaboration system 200, some embodiments may differ. In some embodiments, the scheduling models 215 may include a single model that predicts both the meeting time parameter 241 and the meeting location parameter 242 based on a feature map formed from the meeting history features 231, the personnel features 232, the attendee location features 233 and the available meeting room features 234. In some embodiments, the meeting time model and meeting location model operate in parallel and combine outputs to form the meeting location parameter 242 and the meeting time parameter 241. In some embodiments, the meeting time model and meeting location model operate in series, with the output of the output of the meeting location model being provided to the meeting time model to generate the meeting time parameter 241 and the meeting location parameter 242.

In some embodiments, an event generator 215 of the calendar machine learning engine 212 may receive the meeting time parameter 241 and the meeting location parameter 242 to generate a candidate scheduled meeting 251. The candidate scheduled meeting 251 represents a meeting request for a corresponding meeting to be scheduled, including a time and location for the meeting and a list of attendees. In some embodiments, the candidate rescheduled meeting 251 may automatically book a meeting a room at the specified time and location. In some embodiments, the candidate scheduled meeting 251 is first provided to each attendee at each user computing device 260. Each attendee may then accept, decline or request an alternative time or location according to a user selection 252. In some embodiments, the user selection 252 may cause the securing of the meeting time at the meeting location according to the candidate scheduled meeting 251.

In some embodiments, the user selection 252 may be provided to an optimizer 213 of the calendaring model 213. In some embodiments, the optimizer 213 may compare the user selection 252 to the corresponding predicted meeting time parameter 241 and meeting location parameter 242. Based on a difference between the user selection 252 to the corresponding predicted meeting time parameter 241 and meeting location parameter 242, the optimizer 213 may determine an error in the predictions by the calendar machine learning engine 212. In some embodiments, the optimizer 213 backpropagates the error to the calendar machine learning engine 212 to train the scheduling models 215 in an on-line fashion such that each prediction may be used as a training pair with the corresponding user selection. Thus, the scheduling models 215 may be updated as users provide user selections 252 to continually improve the scheduling models 215. In some embodiments, the optimizer 213 may employ optimization models including, but not limited to, e.g., gradient descent, regularization, stochastic gradient descent, Nesterov accelerated gradient, Adagrad, AdaDelta, adaptive momentum estimation (AdaM), root-mean-square propagation (RMS Prop), among others and combinations thereof.

In some embodiments, the user selection 252 may be a second selection after an initial selection. For example, where a user initially accepts the candidate scheduled meeting 251 via the user selection 252, the user may later cancel the meeting by a second user selection 252. The second user selection may be provided to the optimizer 213 in a similar fashion to the initial user selection 252 to determine an error and train the calendar machine learning engine 212. Moreover, the user selection 252 and/or the candidate scheduled meeting 251 may be provided to the meeting history of each attendee in the calendar database 201 to update the calendar database 201 with current information.

Similarly, in some embodiments, the user selection 252 and/or the corresponding candidate scheduled meeting 251 may be provided to each of the location database 203 and the meeting room database 204 to update information related to the location of attendees and availability of meeting rooms at the time of the candidate scheduled meeting 251. In some embodiments, the collaboration databases 270 are only updated upon the user selection 251.

Figure 4:
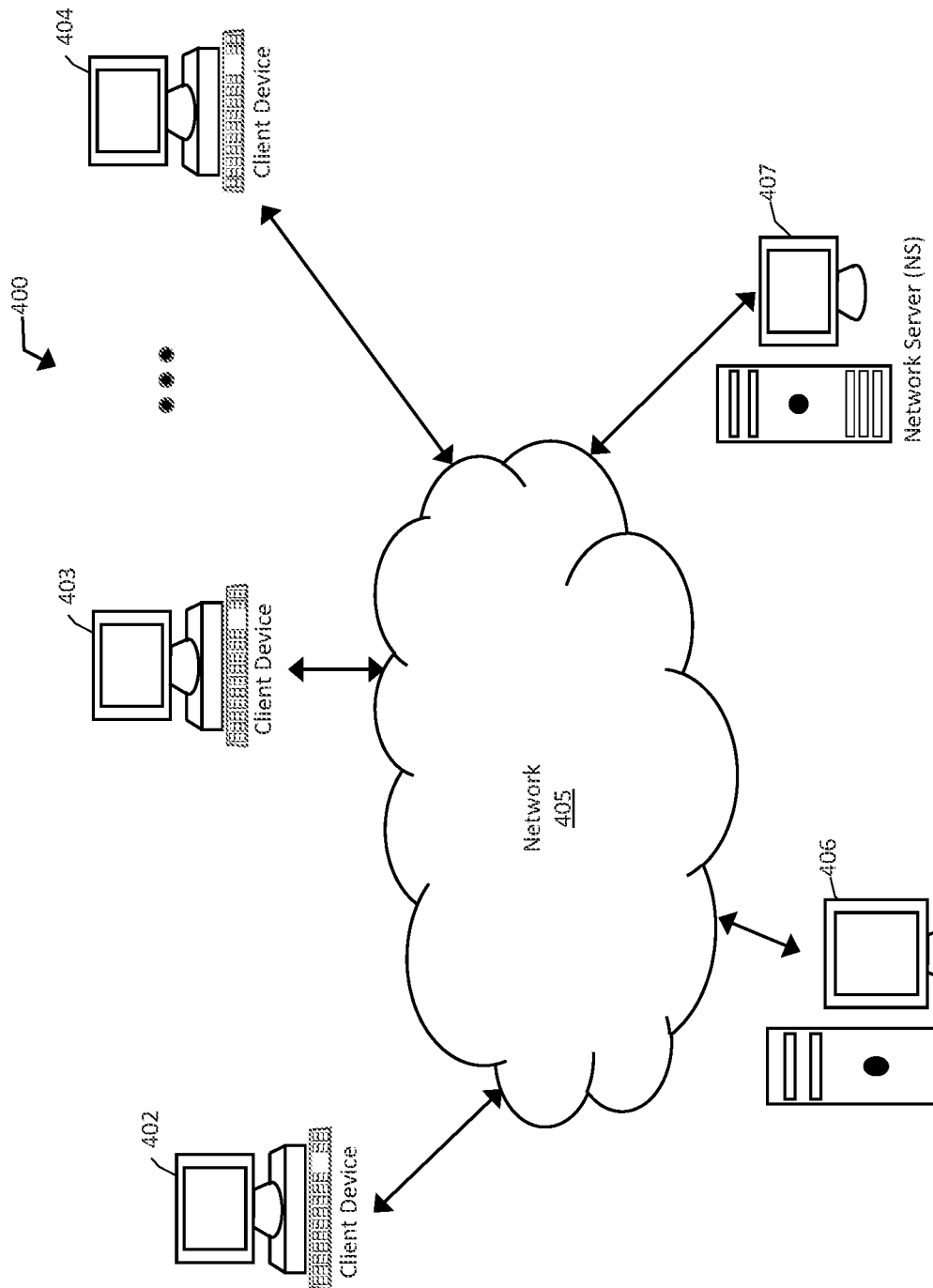

In some embodiments, referring to FIG. 4, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
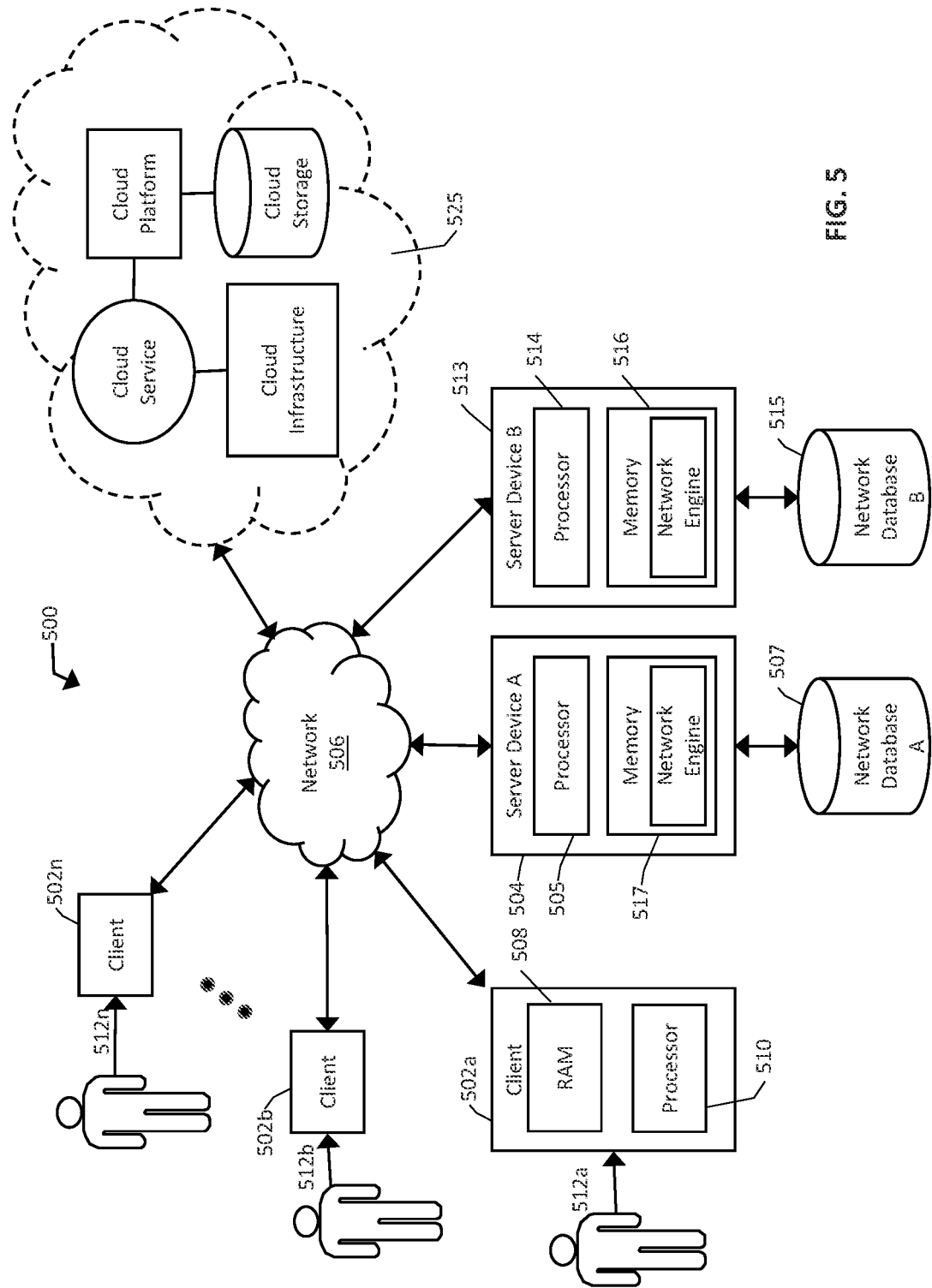

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through n may also comprise a number of external or internal devices such as a mouse, a CD-ROM, DVD, a physical or virtual keyboard, a display, or other input or output devices. In some embodiments, examples of member computing devices 502a through n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through n may be specifically programmed with one or more application programs in accordance with one or more principles/methodologies detailed herein. In some embodiments, member computing devices 502a through n may operate on any operating system capable of supporting a browser or browser-enabled application, such as Microsoft™, Windows™, and/or Linux. In some embodiments, member computing devices 502a through n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through n, users, 512a through n, may communicate over the exemplary network 506 with each other and/or with other systems and/or devices coupled to the network 506. As shown in FIG. 5, exemplary server devices 504 and 513 may be also coupled to the network 506. In some embodiments, one or more member computing devices 502a through n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
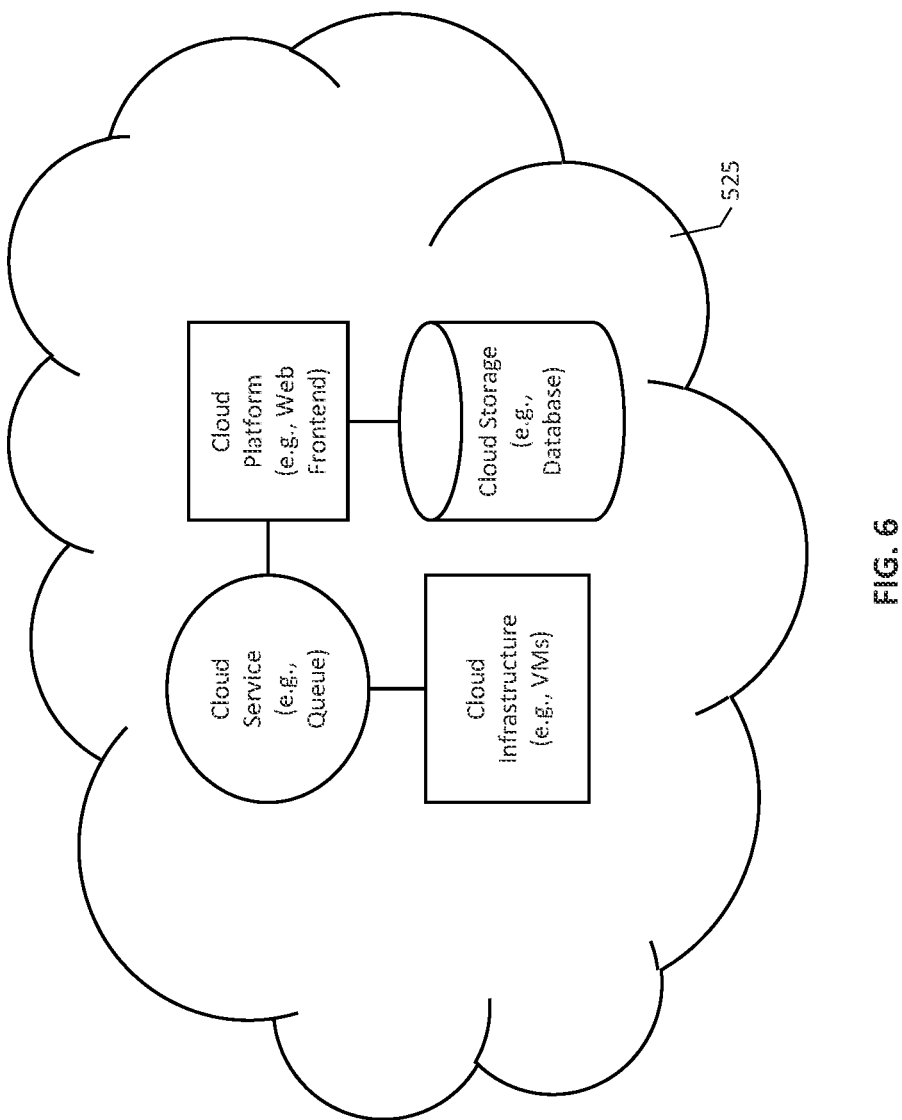
Figure 7:
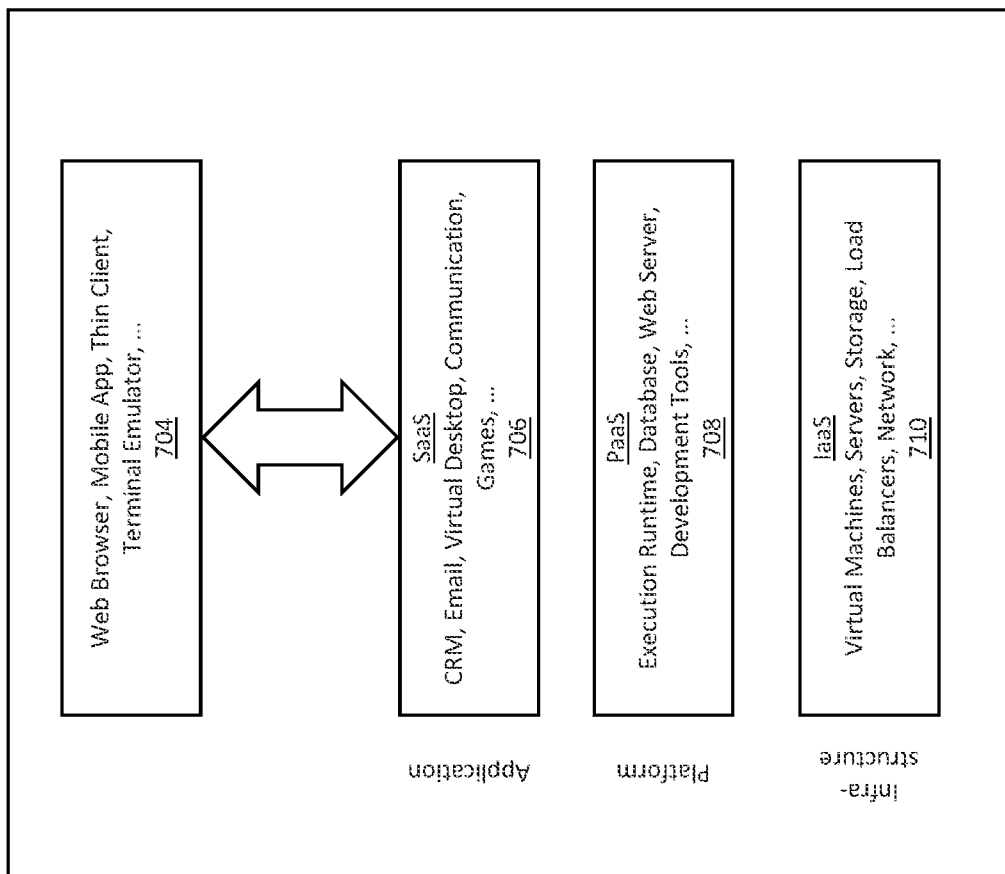

In some embodiments, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS), platform as a service (PaaS), and/or software as a service (SaaS). FIGS. 6 and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

At least some aspects of the present disclosure will now be described with reference to the following numbered clauses.

1. A method comprising:
   receiving, by at least one processor, a plurality of electronic meeting requests to schedule a meeting;
   wherein each electronic meeting request comprises an attendee data identifying at least one respective attendee of each respective meeting;
   determining, by the at least one processor, for each electronic meeting request, a plurality of meeting room needs;
   wherein the plurality of meeting room needs comprise:
      i) at least one meeting room resource that the at least one respective attendee would require at least one candidate meeting room to have, and
      ii) a meeting room size of the at least one candidate meeting room; and
   utilizing, by the at least one processor, a meeting scheduling machine learning model to predict a plurality of parameters of at least one meeting room object representing the at least one candidate meeting room based at least in part on the plurality of meeting room needs, schedule information associated with a respective electronic meeting request and location information associated with the respective electronic meeting request;
   wherein the plurality of parameters of at least one meeting room object comprises:
      i) a meeting location parameter, and
      ii) a meeting time parameter;
   wherein the schedule information comprises:
      i) an availability data identifying availability of each of the at least one respective attendee based on respective calendar data obtained from each respective electronic calendar associated with the respective at least one attendee,
      ii) a meeting history data identifying meeting history of the at least one respective attendee based on the respective calendar data obtained from each respective electronic calendar associated with the respective at least one attendee,
   wherein the meeting history data comprises:
      1) cancellation data identifying meeting cancellations, and
      2) rescheduling data identifying meeting rescheduling occurrences;
   wherein the location information comprises:
      i) an attendee location data identifying at least one respective location associated with the at least one respective attendee,
      ii) available meeting room data identifying all available meeting rooms, and
      iii) a meeting room location associated with each available meeting room;
   causing to display, by the at least one processor, an indication of the at least one candidate meeting room in response to the at least one electronic meeting request on a screen of at least one computing device associated with the at least one respective attendee based at least in part on the plurality of predicted parameters of at least one respective meeting room object representing at least one respective candidate meeting room;
   receiving, by the at least one processor, a selection of the at least one respective candidate meeting room from the at least one respective attendee; and
   dynamically securing, by the at least one processor, the at least one respective candidate meeting room for at least one respective meeting.

2. The method of clause 1, wherein the attendee location data associated with the at least one respective attendee comprises a real-time location based on tracking an employee badge.

3. The method of clause 1, wherein the attendee location data associated with the at least one respective attendee comprises a real-time location based on global positioning (GPS) data associated with an attendee mobile device.

4. The method of clause 1, further comprising determining, by the at least one processor, traffic data identifying a traffic delay for a transit time associated a transit from each respective attendee location to each meeting room location associated with each available candidate meeting rooms.

5. The method of clause 1, further comprising determining, by the at least one processor, a cancellation prediction using the meeting scheduling machine learning model based at least in part on the cancellation data associate with each of the at least one respective attendee.

6. The method of clause 1, wherein the meeting scheduling machine learning model is further utilized to predict an attendee prioritization parameter associated with a prioritization of the schedule information and the location information associated with the at least one respective attendee to prioritize the availability associated with each of the at least one attendee according to each respective hierarchical position associated with each respective at least one attendee;
wherein the hierarchical position of each of the at least one attendee is based on an organization chart.

7. The method of clause 1, further comprising training, by the at least one processor, the meeting scheduling machine learning model based on a meeting result;

8. The method of clause 7, wherein the meeting result comprises meeting disposition data identifying a completed meeting at the meeting location and at the meeting time.

9. The method of clause 7, wherein the meeting disposition data comprises one of selection comprising a cancellation indication and a reschedule indication;
wherein the cancellation indication identifies:
i) a cancelling of the meeting location, and
ii) a cancelling of the meeting time;
wherein the reschedule indication identifies:
i) a rescheduling of the meeting location, and
ii) a rescheduling of the meeting time.

10. A method comprising:
receiving, by the at least one processor, a plurality of electronic reschedule requests to reschedule a plurality of scheduled meetings for a plurality of meeting rooms;
wherein each electronic reschedule request comprises an attendee data identifying at least one respective attendee of each respective scheduled meeting;
determining, by the at least one processor, for each electronic schedule request, a plurality of meeting room needs;
wherein the plurality meeting room needs comprise:
i) at least one meeting room resource that the at least one respective attendee would require at least one candidate meeting room to have, and
ii) a meeting room size of the at least one candidate meeting room;
determining, by the at least one processor, an error in a plurality of parameters of at least one meeting room object representing the at least one candidate meeting room for training a meeting scheduling machine learning model based at least in part on a plurality of respective scheduled meetings associated with a plurality of respective electronic reschedule requests, schedule information associated with the respective electronic reschedule request and location information associated with the respective electronic reschedule request;
wherein the plurality of parameters of at least one meeting room object comprises:
i) a meeting location parameter, and
ii) a meeting time parameter;
wherein the schedule information comprises:
i) an availability data identifying availability of each of the at least one respective attendee based on respective calendar data obtained from each respective electronic calendar associated with the respective at least one attendee,
ii) a meeting history data identifying meeting history of the at least one respective attendee based on the respective calendar data obtained from each respective electronic calendar associated with the respective at least one attendee,
wherein the meeting history data comprises:
1) cancellation data identifying meeting cancellations, and
2) rescheduling data identifying meeting rescheduling occurrences;
wherein the location information comprises:
i) an attendee location data identifying at least one respective location associated with the at least one respective attendee,
ii) available meeting room data identifying all available meeting rooms, and
iii) a meeting room location associated with each available meeting room;
utilizing, by the at least one processor, the meeting scheduling machine learning model to predict a plurality of new parameters of the at least one meeting room object representing the at least one candidate meeting room based at least in part on the plurality of meeting room needs, the schedule information associated with a respective electronic meeting request and the location information associated with the respective electronic meeting request;
causing to display, by the at least one processor, an indication of the at least one candidate meeting room in response to the at least one electronic reschedule request on a screen of at least one computing device associated with the at least one respective attendee based at least in part on the plurality of predicted parameters of the at least one respective meeting room object representing the at least one respective candidate meeting room;
receiving, by the at least one processor, a selection of the at least one respective candidate meeting room from the at least one respective attendee; and
dynamically securing, by the at least one processor, the at least one respective candidate meeting room for at least one respective meeting.

11. The method of clause 10, wherein the attendee location data associated with the at least one respective attendee comprises a real-time location based on tracking an employee badge.

12. The method of clause 10, wherein the attendee location data associated with the at least one respective attendee comprises a real-time location based on global positioning (GPS) data associated with an attendee mobile device.

13. The method of clause 10, further comprising determining, by the at least one processor, traffic data identifying a traffic delay for a transit time associated a transit from each respective attendee location to each meeting room location associated with each available candidate meeting rooms.

14. The method of clause 10, further comprising determining, by the at least one processor, a cancellation prediction using the meeting scheduling machine learning model based at least in part on the cancellation data associate with each of the at least one respective attendee.

15. The method of clause 10, wherein the meeting scheduling machine learning model is further utilized to predict an attendee prioritization parameter associated with a prioritization of the schedule information and the location information associated with the at least one respective attendee to prioritize the availability associated with each of the at least one attendee according to each respective hierarchical position associated with each respective at least one attendee;
wherein the hierarchical position of each of the at least one attendee is based on an organization chart.

16. The method of clause 10, further comprising training, by the at least one processor, the meeting scheduling machine learning model based on a meeting result;

17. The method of clause 16, wherein the meeting result comprises meeting disposition data identifying a completed meeting at the meeting location and at the meeting time.

18. The method of clause 16, wherein the meeting disposition data comprises one of selection comprising a cancellation indication and a reschedule indication;
wherein the cancellation indication identifies:
i) a cancelling of the meeting location, and
ii) a cancelling of the meeting time;
wherein the reschedule indication identifies:
i) a rescheduling of the meeting location, and
ii) a rescheduling of the meeting time.

19. A system comprising:
a calendar database configured to store calendar data associated with each employee of an organization;
a meeting room database configured to store meeting room characteristics of possible meeting rooms of the organization; and
at least one processor in communication with the calendar database and the meeting room database;
wherein the at least one processor is configured to:
receive a plurality of electronic meeting requests to schedule a meeting;
wherein each electronic meeting request comprises an attendee data identifying at least one respective attendee of each respective meeting;
determine for each electronic meeting request, a plurality of meeting room needs;
wherein the plurality of meeting room needs comprise:
i) at least one meeting room resource that the at least one respective attendee would require at least one candidate meeting room to have, and
ii) a meeting room size of the at least one candidate meeting room; and
utilize a meeting scheduling machine learning model a to predict a plurality of parameters of at least one meeting room object representing the at least one candidate meeting room based at least in part on the plurality of meeting room needs, schedule information associated with a respective electronic meeting request and location information associated with the respective electronic meeting request;
wherein the plurality of parameters of at least one meeting room object comprises:
i) a meeting location parameter, and
ii) a meeting time parameter;
wherein the schedule information comprises:
i) an availability data identifying availability of each of the at least one respective attendee based on respective calendar data obtained from each respective electronic calendar associated with the respective at least one attendee,
ii) a meeting history data identifying meeting history of the at least one respective attendee based on the respective calendar data obtained from each respective electronic calendar associated with the respective at least one attendee,
wherein the meeting history data comprises:
1) cancellation data identifying meeting cancellations, and
2) rescheduling data identifying meeting rescheduling occurrences;
wherein the location information comprises:
i) an attendee location data identifying at least one respective location associated with the at least one respective attendee,
ii) available meeting room data identifying all available meeting rooms, and
iii) a meeting room location associated with each available meeting room;
cause to display an indication of the at least one candidate meeting room in response to the at least one electronic meeting request on a screen of at least one computing device associated with the at least one respective attendee based at least in part on the plurality of predicted parameters of the at least one respective meeting room object representing the at least one respective candidate meeting room;
receive a selection of the at least one respective candidate meeting room from the at least one respective attendee; and
dynamically secure the at least one respective candidate meeting room for at least one respective meeting.

20. The system of clause 19, wherein the at least one processor is further configured to determine traffic data identifying a traffic delay for a transit time associated a transit from each respective attendee location to each meeting room location associated with each available candidate meeting rooms.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method comprising:
receiving, by at least one processor, an out-of-office notification from a first user of a plurality of users;
wherein the out-of-office notification comprises an out-of-office time period;
identifying, by the at least one processor, at least one need-to-reschedule meeting data item of at least one need-to-reschedule meetings associated with the out-of-office time period;
identifying, by the at least one processor, at least one additional user of the plurality of users associated with the at least one need-to-reschedule meeting;
accessing, by the at least one processor, meeting history data associated with each user of the plurality of users;
accessing, by the at least one processor, calendar data associated with each user of the plurality of users;

wherein the calendar data of each user is associated with a subsequent time period after the out-of-office time period;

utilizing, by the at least one processor, a meeting scheduling machine learning model to predict a plurality of parameters of the at least one meeting room object representing at least one candidate rescheduled meeting associated with the at least one need-to-reschedule meeting;

wherein the meeting scheduling machine learning model is configured to predict the plurality of parameters of the at least one meeting room object based at least in part on:

the meeting history data of each user of the plurality of users, the calendar data associated with each user of the plurality of users; and causing to display, by the at least one processor, an indication of at least one candidate rescheduled meeting and the at least one meeting room object in response to the at least one out-of-office notification on a screen of computing device associated with each user of the plurality of users.

2. The method of claim 1, further comprising:
accessing, by the at least one processor, meeting room availability data associated with at least one meeting room object for the subsequent time period;
wherein the at least one meeting room object comprises at least one data object indicative of at least one meeting room;
utilizing, by the at least one processor, the meeting scheduling machine learning model to predict the plurality of parameters of the at least one meeting room object based at least in part on the meeting room availability data associated with the at least one meeting room object.

3. The method of claim 1, wherein the calendar data further comprises attendee location data associated with the at least one respective attendee comprising a real-time location based on tracking an employee badge.

4. The method of claim 3, wherein the attendee location data associated with the at least one respective attendee comprises a real-time location based on global positioning (GPS) data associated with an attendee mobile device.

5. The method of claim 1, further comprising determining, by the at least one processor, traffic data identifying a traffic delay for a transit time associated a transit from each respective attendee location to each meeting room location associated with each available candidate meeting rooms of the location information.

6. The method of claim 1, further comprising determining, by the at least one processor, a cancellation prediction using the meeting scheduling machine learning model based at least in part on the cancellation data associate with each of the at least one respective attendee.

7. The method of claim 1, wherein the meeting scheduling machine learning model is further utilized to predict an attendee prioritization parameter to prioritize the availability associated with each of the at least one attendee according to each respective hierarchical position associated with each respective at least one attendee;

wherein the attendee prioritization parameter comprises:
i) a prioritization of the schedule information associated with the at least one respective attendee, and
ii) the location information associated with the at least one respective attendee;

wherein the hierarchical position of each of the at least one attendee is based on an organization chart.

8. The method of claim 1, further comprising training, by the at least one processor, the meeting scheduling machine learning model based on a meeting result.

9. The method of claim 8, wherein the meeting result comprises meeting disposition data identifying a completed meeting at the meeting location and at the meeting time.

10. The method of claim 8, wherein the meeting disposition data comprises one of selection comprising a cancellation indication and a reschedule indication;
wherein the cancellation indication identifies:
i) a cancelling of the meeting location, and
ii) a cancelling of the meeting time;
wherein the reschedule indication identifies:
i) a rescheduling of the meeting location, and
ii) a rescheduling of the meeting time.

11. A system comprising:
at least one processor configured to implement software instructions causing the at least one processor to perform steps to:
receive an out-of-office notification from a first user of a plurality of users;
wherein the out-of-office notification comprises an out-of-office time period;
identify at least one need-to-reschedule meeting data item of at least one need-to-reschedule meetings associated with the out-of-office time period;
identify at least one additional user of the plurality of users associated with the at least one need-to-reschedule meeting;
access meeting history data associated with each user of the plurality of users;
access calendar data associated with each user of the plurality of users;
wherein the calendar data of each user is associated with a subsequent time period after the out-of-office time period;
utilize, a meeting scheduling machine learning model to predict a plurality of parameters of the at least one meeting room object representing at least one candidate rescheduled meeting associated with the at least one need-to-reschedule meeting;
wherein the meeting scheduling machine learning model is configured to predict the plurality of parameters of the at least one meeting room object based at least in part on:
the meeting history data of each user of the plurality of users,
the calendar data associated with each user of the plurality of users; and
cause to display an indication of at least one candidate rescheduled meeting and the at least one meeting room object in response to the at least one out-of-office notification on a screen of computing device associated with each user of the plurality of users.

12. The system of claim 11, wherein the at least one processor is further configured to implement instructions causing the at least one processor to perform steps to:
accessing, by the at least one processor, meeting room availability data associated with at least one meeting room object for the subsequent time period;
wherein the at least one meeting room object comprises at least one data object indicative of at least one meeting room;

utilizing, by the at least one processor, the meeting scheduling machine learning model to predict the plurality of parameters of the at least one meeting room object based at least in part on the meeting room availability data associated with the at least one meeting room object.

13. The system of claim 11, wherein the calendar data further comprises attendee location data associated with the at least one respective attendee comprising a real-time location based on tracking an employee badge.

14. The system of claim 13, wherein the attendee location data associated with the at least one respective attendee comprises a real-time location based on global positioning (GPS) data associated with an attendee mobile device.

15. The system of claim 11, wherein the at least one processor is further configured to implement instructions causing the at least one processor to perform steps to determine traffic data identifying a traffic delay for a transit time associated a transit from each respective attendee location to each meeting room location associated with each available candidate meeting rooms of the location information.

16. The system of claim 11, wherein the at least one processor is further configured to implement instructions causing the at least one processor to perform steps to determine a cancellation prediction using the meeting scheduling machine learning model based at least in part on the cancellation data associate with each of the at least one respective attendee.

17. The system of claim 11, wherein the meeting scheduling machine learning model is further utilized to predict an attendee prioritization parameter to prioritize the availability associated with each of the at least one attendee according to each respective hierarchical position associated with each respective at least one attendee;
wherein the attendee prioritization parameter comprises:
i) a prioritization of the schedule information associated with the at least one respective attendee, and
ii) the location information associated with the at least one respective attendee;
wherein the hierarchical position of each of the at least one attendee is based on an organization chart.

18. The system of claim 11, wherein the at least one processor is further configured to implement instructions causing the at least one processor to perform steps to train the meeting scheduling machine learning model based on a meeting result.

19. The system of claim 18, wherein the meeting result comprises meeting disposition data identifying a completed meeting at the meeting location and at the meeting time.

20. The system of claim 18, wherein the meeting disposition data comprises one of selection comprising a cancellation indication and a reschedule indication;
wherein the cancellation indication identifies:
i) a cancelling of the meeting location, and
ii) a cancelling of the meeting time;
wherein the reschedule indication identifies:
i) a rescheduling of the meeting location, and
ii) a rescheduling of the meeting time.

* * * * *